United States Patent [19]

Citta et al.

[11] Patent Number: 5,260,793
[45] Date of Patent: Nov. 9, 1993

[54] RECEIVER POST CODER SELECTION CIRCUIT

[75] Inventors: Richard W. Citta, Oak Park; Gary J. Sgrignoli, Mt. Prospect; Rudolf Turner, Hawthorn Woods, all of Ill.

[73] Assignee: Zenith Electronics Corporation, Glenview, Ill.

[21] Appl. No.: 893,486

[22] Filed: Jun. 5, 1992

Related U.S. Application Data

[63] Continuation-in-part of Ser. No. 732,387, Jul. 18, 1991, abandoned.

[51] Int. Cl.⁵ .......................................... H04N 5/213
[52] U.S. Cl. .................................. 358/167; 358/188; 455/63; 455/296; 375/99; 375/103
[58] Field of Search .............. 358/167, 36, 188, 135, 358/181; 375/102, 100, 99, 101, 103, 14; 455/296, 306, 307, 303, 63, 308

[56] References Cited

U.S. PATENT DOCUMENTS

| | | | |
|---|---|---|---|
| 4,216,496 | 8/1980 | Lothian et al. | 358/83 |
| 4,493,102 | 1/1985 | Weishaupt et al. | 455/303 |
| 4,673,982 | 6/1987 | Tam et al. | 358/166 |
| 4,771,438 | 9/1988 | Nash | 375/78 |
| 4,862,173 | 8/1989 | Nishitani | 358/135 |
| 4,910,799 | 3/1990 | Tayakama | 455/296 |
| 4,953,183 | 8/1990 | Bergmanns et al. | 375/14 |
| 5,086,340 | 2/1992 | Citta et al. | 375/103 |
| 5,107,519 | 4/1992 | Tshikawa | 358/135 |
| 5,117,291 | 5/1992 | Fadaui-Ardokani et al. | 358/187 |
| 5,121,203 | 6/1992 | Citta | 358/167 |

*Primary Examiner*—James J. Groody
*Assistant Examiner*—Jeffrey S. Murrell

[57] ABSTRACT

A digital video field identification system includes video signals formatted in blocks of video symbols in repetitive data segments with each data segment including a synchronizing signal character. One data segment includes a field timing signal. A field reference data segment which includes the field timing signal is developed at the receiver. Each data segment is compared with the field reference data segment and the number of symbol errors is accumulated for each data segment. The data segment exhibiting the least number of symbol errors is identified as the field timing segment. A confidence counter stabilizes the identification of said one data segment. The video signals are precoded in modulo N form to enable NTSC co-channel interference rejection in the receiver by a linear filter. The linear filter undesirably reduces the S/N ratio by 3dB. A selection circuit is included for bypassing the linear filter (for the video data) based upon the errors developed in the signal paths with and without the linear filter.

18 Claims, 3 Drawing Sheets

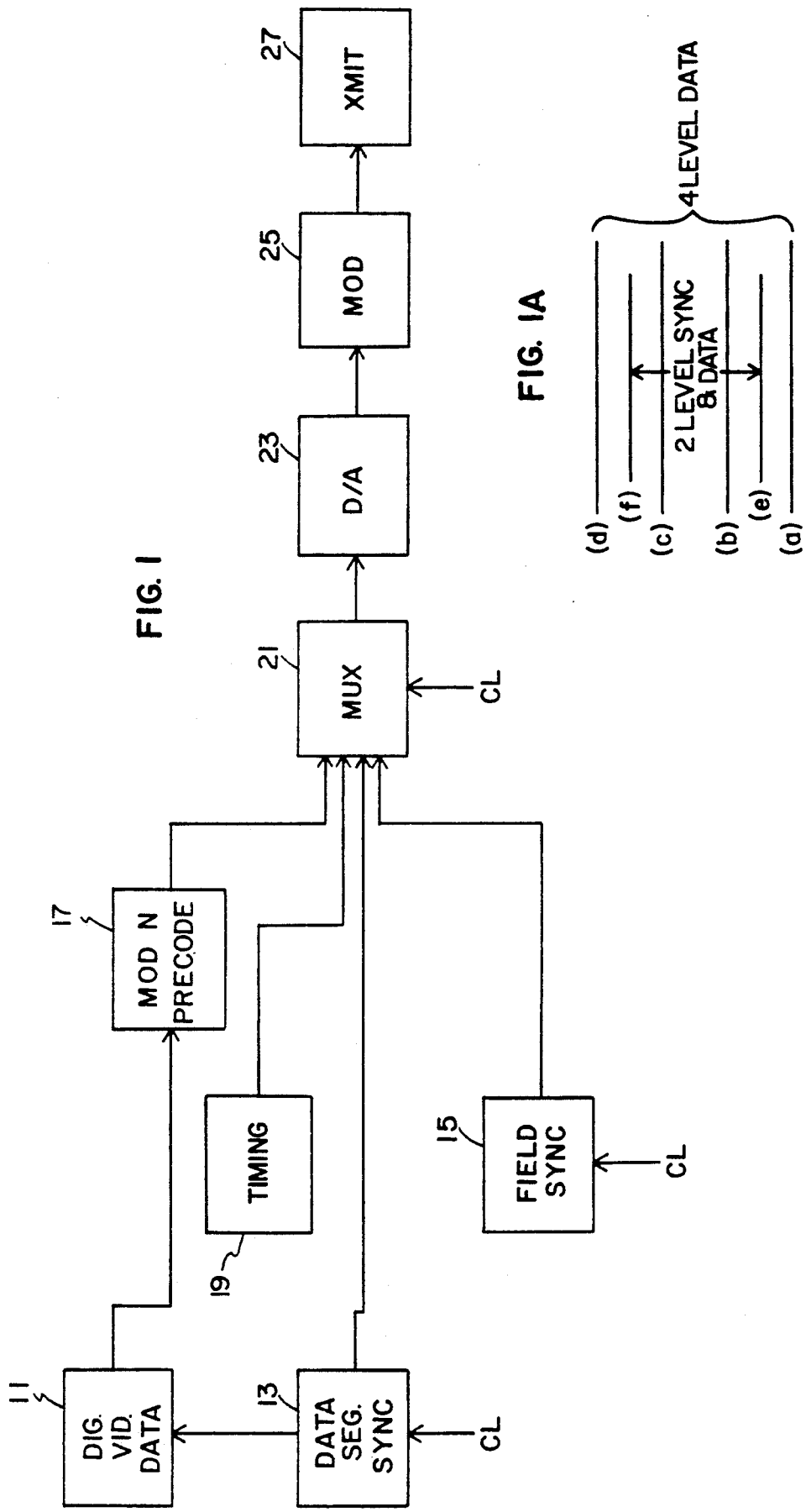

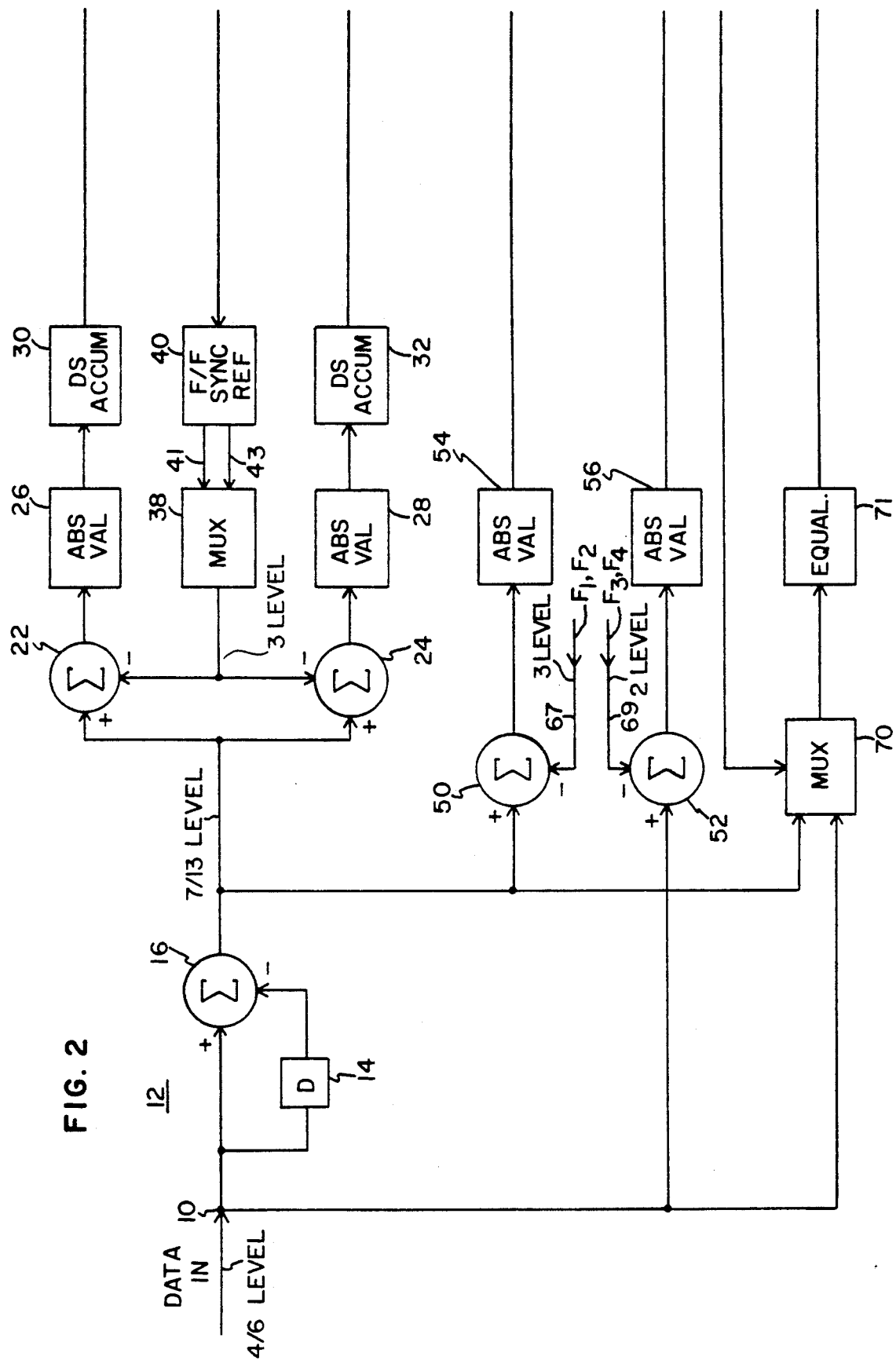

RECEIVER POST CODER SELECTION CIRCUIT

CROSS REFERENCE TO RELATED PATENT APPLICATIONS

This invention is a continuation-in-part of Ser. No. 732,387, filed Jul. 18, 1991, (now abandoned) and is related to the inventions described and claimed in U.S. Pat. No. 5,086,340; Ser. No. 894,388, filed Jun. 5, 1992, which is a continuation-in-part of Ser. No. 763,848, (now abandoned) filed Sep. 23, 1991, which is a continuation-in-part of Ser. No. 732,369, filed Jul. 18, 1991, (now abandoned) and Ser. No. 894,406, filed Jun. 5, 1992, which is a continuation-in-part of Ser. No. 732,368, filed Jul. 18, 1991, (now abandoned) all of which are assigned to Zenith Electronics Corporation and all of which are incorporated by reference herein.

BACKGROUND OF THE INVENTION

This invention relates generally to a high definition television (HDTV) system and specifically to a digital spectrum compatible (DSC) HDTV system.

Zenith Electronics Corporation, which previously announced its spectrum compatible high definition television system, recently announced its digital implementation thereof, which is called DSC-HDTV. In this system, encoded video data is formatted in a transmission frame having a plurality of successive data segments, each comprising a series of multi-level data symbols, including a predetermined data segment sync character. The data segment sync character, which establishes the timing of the data segments, is selected such that it produces a zero or reference level between higher and lower levels at three successive sampling points in the received television signal. The repetitive nature of the data segments and their timing enables ready detection of the data segment sync characters without requiring an excessive amount of data space in each data segment. That invention is described and claimed in copending application Ser. No. 894,388 above.

As fully described in U.S. Pat. No. 5,086,340, referred to above, HDTV receivers preferably employ special linear filters for minimizing the effects Of NTSC co-channel signals. The linear filter has null points or notches that correspond to the NTSC signal frequencies that have the greatest interference-causing potential and a notch at DC, which has a benefit in that any direct current components acquired by the signal are precluded from the receiver. Thus, the benefits of the linear filter in the receiver are the rejection of NTSC signal interference and DC rejection. The disadvantages are a 3 dB signal-to-noise (S/N) loss and some corruption of the data. To preserve the data, a modulo N precoder is used in the transmitter and the receiver must incorporate suitable postcoding circuitry to reconvert the data. The modulo N precoder comprises a modulo N adder and a delay circuit in a feedback arrangement. An N level input signal thus yields an N level output signal.

The N level input to a linear filter, consisting of an algebraic adder and a delay circuit in a feed forward configuration, results in a greater than N level output signal. The number of levels is dependent upon the number of feed forward taps on the delay unit. For a single tap delay (modulo 4), the output is given by the formula $2N-1$. The linear filter must be followed by an appropriate "slicer" to yield the correct N level data signals.

Where there is no significant NTSC co-channel interference, the linear filter 3 dB S/N loss may be avoided by processing the precoded modulo N signal through a suitable modulo N postcoder in the receiver to again produce the original N level data signal.

The transmission frame preferably also includes selected field sync signals. In one embodiment, the field sync or timing signals are 2 level symbols and the data is, for example, in either 2 level or 4 level symbol form. The levels of the 2 level symbols may comprise a subset of the levels of the 4 level symbols. Thus, if four levels (a), (b), (c) and (d) are used, levels (a) and (c) may be used for 2 level data, all four levels [(a), (b), (c), (d)] may be used for 4 level data and the two outermost levels (a) and (d) used for the 2 levels of the sync information or timing signals. Such an arrangement yields a robust sync signal, which is highly desirable. As will be seen, the S/N loss introduced by the linear filter in the receiver is acceptable with the more robust 2 outer level sync signal. The interference rejection of the linear filter enables the receiver to stay locked even under very weak and noisy signal conditions.

In an alternative and presently preferred embodiment, the levels of the 2 level data and the synchronizing information may be between or intermediate the two upper and two lower levels of the 4 level data, i.e. between levels (a) and (b) and between levels (c) and (d). In the copending application Ser. No. 894,388 the level intermediate levels (a) and (b) is referred to as level (e) and the level intermediate levels (c) and (d) is referred to as level (f). Thus there are in reality six distinct levels. While the sync in this embodiment is not as robust as sync symbols having the 2 outer levels (a) and (d), the arrangement provides an average pilot which is equal for both 2 level and 4 level data and causes less interference into an NTSC co-channel.

The invention in copending application Ser. No. 894,406 is concerned with recovery of a field or frame timing signal from the transmitted data segments. The data segments are the same length, each comprising 684 symbols, with 525 data segments corresponding to a transmitted video frame. Each frame further comprises alternating fields of 262 and 263 data segments. Although the data segments and data fields are preferably transmitted at the NTSC horizontal and vertical rates, respectively, it will be understood that the data segments do not directly correspond to horizontal scanning lines in a television display system.

One of the data segments in each video field defines a field timing signal that identifies the beginning of the field. The field timing signal is thus similar in function to the vertical timing signal in a conventional television system. Means are provided in the receiver for recreating a reference data segment that includes a reference field timing signal. This may be accomplished with a PROM or other suitable memory device, or preferably may be accomplished by developing the digital field reference timing signal on an as-needed basis, i.e. each field or each frame. Each data segment is detected and compared with the reference data segment and the errors between corresponding symbols in the compared data segments are accumulated. The data segment in each field that exhibits the least number of symbol errors is assumed to identify the start of the field and is used to establish the timing relationship for the receiver. A confidence counter is employed to stabilize the identification process. For enhanced noise immunity and stability, the preferred embodiment includes a different field reference timing signal in each of the two successive fields of data segments. In this embodiment, a field reference sync generator recreates the two different reference data segments for comparison with the alternating fields of data segments.

The present invention provides for the selection of alternate signal processing paths in the receiver, for minimizing the S/N loss due to the linear filter, in environments that have no significant NTSC co-channel interfering signals. The selection circuit of the invention bypasses the linear filter in the receiver in situations where NTSC co-channel interference is not determined to be a problem and instead processes the received signal using a complementary modulo 4 postcoding filter.

OBJECTS OF THE INVENTION

A principal object of the invention is to provide a novel field timing signal for a digital television system.

A further object of the invention is to provide a simple arrangement for minimizing co-channel interference without degradation of the signal to noise ratio of the received DSC-HDTV signal.

BRIEF DESCRIPTION OF THE DRAWINGS

These and other objects and advantages of the invention will be apparent upon reading the following description in conjunction with the drawings in which:

FIG. 1 is a simplified block diagram of a transmitter constructed in accordance with the invention;

FIG. 1A illustrates the various levels for 2/4 level data and 2 level sync; and

DESCRIPTION OF THE PREFERRED EMBODIMENT

Figure 2:
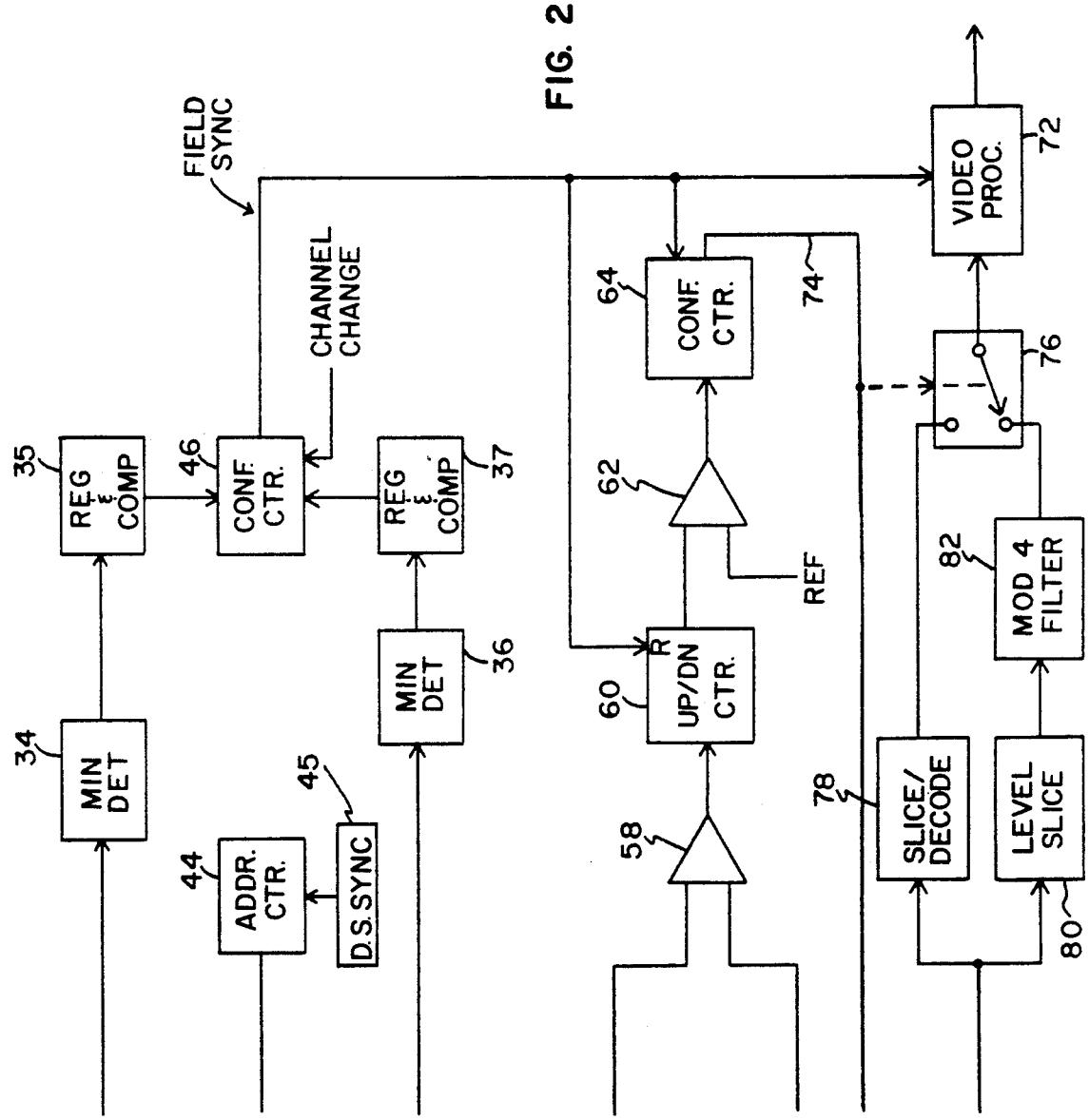
FIG. 2 is a simplified block diagram of a field timing signal determination circuit and a receiver post coder selection circuit.

In FIG. 1, a transmitter having a source of digital video data 11, a data segment sync generator 13 and a field sync generator 15 are shown. Data source 11 is coupled to a modulo N precoder 17. Data segment sync source 13, field sync source 15, precoder 17 and a timing control source 19 are coupled to a multiplexer (MUX) 21. The output of MUX 21 is supplied to a digital-to-analog (D/A) converter 23. D/A 23 feeds a modulator 25 which in turn supplies a signal to a transmission block 27 for transmission. A data clock (not shown) supplies proper timing for the formatting of the data segment sync and the video into groups or fields of successive data segments. As mentioned, the data and data segment sync may be either 2 level symbols or 4 level symbols although the data segment sync is preferably 2 level symbols. The field sync may also comprise 2 or 4 level symbols although again it preferably is 2 level symbols. If the four levels are (a), (b), (c) and (d), the 2 level data (and data segment sync) may comprise levels (a) and (c) or alternatively and preferably, levels intermediate levels (a) and (b) and levels (c) and (d). The 2 level field sync symbols on the other hand may extend between the outer levels (a) and (d), which makes it robust and therefore easy to detect and noise immune. Alternatively and preferably, the field sync may use the same levels as the data segment sync. As shown in FIG. 1A, the 2 level sync and 2 level data may share the same levels (e) and (f) that are intermediate levels (a) and (b) and levels (c) and (d), respectively, for the 4 level data. This arrangement has proven satisfactory for good sync recovery and has the benefit of reducing sync power and consequent potential for interference into co-channels.

Referring to FIG. 2, a received digital video data signal is supplied to an input terminal 10. While it is assumed to be either a 4 or 6 level signal (4/6), any level signals, including different multi level signals, may be used and identified (as to type) by suitable header information in the data transmission. It will be appreciated that, while not shown, all of the relevant receiver circuits are supplied with clock timing signals. Consequently, the data segments are locked and the task is to determine which of the data segments denotes the beginning of the associated field. Two reference data segments each preferably comprising 668 pseudo random 2 level (e) and (f) symbols as previously described are used and the "No. 1" data segment differs from the "No. 263" data segment. Those skilled in the art will readily recognize that it is not necessary to identify a reference data segment in each field, one data segment for each frame being sufficient. However, the redundancy of a field timing data segment in each field enables better, more reliable performance under noisy reception conditions.

The video data is in the form of precoded modulo N video symbols as specified in U.S. Pat. No. 5,086,340. (The synchronizing signals are seen not to be precoded in the transmitter of FIG 1.) The input signal includes successive fields of video data, each field containing repetitive data segments of 684 symbols each. Two successive data fields (of 262/263 data segments) ar transmitted for each data frame. A data segment sync interval at the beginning of each data segment includes a predetermined data segment sync character preferably comprising four 2 level [(e) or (f)] symbols for establishing data segment timing. As previously mentioned, each of the alternating fields of 262/263 data segments corresponds to one NTSC field although the data segments do not individually correspond to horizontal NTSC lines. A linear post coder circuit 12, configured in a complementary relationship to the transmitter modulo N precoder, comprises a feed forward circuit including a delay 14 and a linear adder 16 with a negative feed forward input. As discussed above, post coder 12 has notches at the NTSC frequencies that have the greatest co-channel interference effects and a notch at DC which precludes any DC that the signal may have acquired from entering the receiver.

It will be noted that linear filter 12 is always in the circuit that determines the field sync signals. This is preferred since the field sync signals must be found, i.e. detected, even in very noisy environments and the presence of NTSC interfering signals can make that task extremely difficult. Despite the S/N ratio loss with linear filter 12, its effect in reducing interference makes it highly desirable in the field timing signal recognition circuit. The use of the two outermost levels of the N level signals makes the field sync relatively easy to find, even in noisy environments although the added signal power has more interference causing potential. As previously described, levels (e) and (f) , intermediate levels (a) and (b) and intermediate levels (c) and (d), respectively, are preferably used for the field sync signal.

The output of adder 16, comprising 13 level symbols (assuming an input of 6 level symbols, i.e. 4 level symbols and 2 level symbols with the 2 level symbols having levels intermediate the 4 levels), is applied to a pair of adders 22 and 24, each of which in turn supplies a respective one of a pair of absolute value circuits 26 and 28. The absolute value circuits 26 and 28 are in turn respectively coupled to data segment error accumulators 30 and 32, each having its output coupled to a respective one of minimum detectors 34 and 36. The outputs of minimum detectors 34 and 36 are respectively coupled to individual register-comparators 35 and 37. The register-comparators 35 and 37 determine which of the data segments accumulates the smallest number of symbol errors (when compared with a reference data segment) in each respective data field. The outputs of the register-comparators 35 and 37 are applied to a confidence counter 46 that supplies the number of the data segment that exhibits the smallest number of errors and which is determined to be the field sync output signal. The negative inputs of adders 22 and 24 are supplied from a MUX 38 that is provided with reference field timing signals on leads 41 and 43 These field timing signals correspond to the 3-level (resultant) reference field timing signals in the respective No. 1 and No. 263 data segments in each of the data fields as developed at the output of linear filter 12. It will be appreciated that the reference data segments (field sync) are not precoded (see FIG. 1) and are 2 level symbols [levels (e) and (f) in the preferred embodiment]. These 2 level symbols are however converted into 3 levels when passed through linear filter 12. These reference data segments, one for each field of a frame, are recreated in a field/frame sync reference circuit 40 and are outputted in accordance with the output of an address counter 44, which is keyed by signals from a data segment sync means 45. Sync means 45 represents the data segment sync that is developed in accordance with the teachings of Ser. No. 894,388 above. The signal must be locked by the data segment sync in order to identify the field timing signals.

As mentioned, confidence counter 46 develops a field sync signal that indicates occurrence of the No. 1 and No. 263 data segments which mark the beginning of the associated fields. This output is used to synchronize the video processing circuit 72. The confidence counter counts up from zero to a maximum when the data segment with the smallest number of symbol errors matches the previous data segment having the smallest number of symbol errors and counts down when a different data segment exhibits the smaller number of symbol errors.

The rate of counting up may advantageously be made different from the rate of counting down to favor the locked condition. These design considerations are determined by signal conditions and empirical data to avoid abrupt changes in synchronization. A channel change input is provided for resetting confidence counter 16 to zero immediately after a change in channel occurs.

The video data at terminal 10 is also applied directly to one input of a MUX 70 and through linear filter 12 to the other input of MUX 70. In accordance with the present invention a switching signal selects which of the input data signals (4/6 level unfiltered or 7/13 level linear filtered) is coupled by MUX 70 to video processor 72 for further processing. The switching signal selection circuitry includes an adder 50, to which is applied the signal from linear filter 12, and an adder 52, to which is applied the signal from input terminal 10. Adder 50 is supplied at its negative input with two reference input signals F1, F2 on lead 67 and adder 52 is similarly supplied with reference signals F3, F4 on lead 69. The reference signals F1 and F2 represent the alternate field references in 3 level form (as received from linear filter 12) whereas the reference signals F3 and F4 similarly correspond to the references in 2 level form (as received directly from input terminal 10). The outputs of adders 50 and 52 represent the difference or error between corresponding symbols in the input signals and the reference signals, and are supplied to absolute value circuits 54 and 56, respectively. The absolute value of the errors are coupled to a comparator 58 whose output goes high when the error produced by circuit 56 exceeds the error produced by circuit 54 and goes low when the error produced by circuit 56 is less than the error produced by circuit 54. The output of comparator 58 supplies an UP/DN counter 60, which counts up in response to one output from comparator 58 and counts down in response to the opposite output.

The field sync from confidence counter 46 is supplied to the reset terminal of UP/DN counter 60 and to an enable input of a confidence counter 64. The UP/DN counter 60 output is compared with a fixed reference number in a comparator 62. The output of comparator 62, which is high or low based upon the relationship between the count of counter 60 and the fixed reference number, is supplied to confidence counter 64 which develops a switching signal on a lead 74 for switching MUX 70 and operating another switch 76. Confidence counter 64, by having its enable input supplied with field sync, is enabled at the end of the appropriate reference data segments to respond to the output of comparator 58. If the count in counter 60 is above the reference signal number at the end of the reference data segment, confidence counter 64 counts in one direction. If it is not, confidence counter 64 counts in the other direction. The "bias" is toward selection of the non post coder path and the reference signal establishes the number of errors that are tolerated before switching to the post coder path (through filter 12).

The output of MUX 70 supplies an equalizer 71 that is incorporated prior to decoding of the signal to help correct for various distortions, such as ghosts and channel tilt. Equalizer 71 supplies a slicer/decoder 78 and a level slicer 80. Slicer/decoder 78 is coupled to one terminal of switch 76 and slicer 80 is coupled to another terminal of switch 76 through a modulo 4 filter 82 which comprises the complement of the transmitter modulo 4 precoding filter. The symbol levels required to be processed by slicer/decoder 78 depend upon the levels selected for the data, field and data segment sync. In the preferred embodiment with 2 level syncs [levels (e) and (f)] and 2 or 4 level data [any of levels (a)-(f)], slicer/decoder 78 would be capable of reconverting the 13 levels of the linear filtered signal to the original 2 and 4 level signals. Similarly slicer 80 is configured to properly slice the precoded 2 and 4 level data and non-precoded 2 level syncs in the preferred embodiment. Thus, the video data is applied through slicer 80 and filter 82 when NTSC co-channel interference is not a significant problem.

To recapitulate, the switching circuit selects either the input signal at data input terminal 10 or the input signal as processed by linear post coder filter 12, for processing in the receiver. The determination is made by comparing the field timing signals (which are not precoded) with suitable reference signals and selecting the path that displays the least number of errors. The reference signals F1 and F2 are the same as those generated by sync reference generator 40 and are switched in accordance with the field that is being received. The reference signals F3 and F4 differ because the effect of linear filter 12 is not present at input terminal 10. The circuit is locked to the output of the field timing signal recognition circuit described above and compares each symbol in the stored reference signal with the corresponding symbols in the field timing signal data segments, as passed directly and as processed by the linear filter (post coder) 12. The absolute values of the errors are compared since the sign or polarity of an error is immaterial. The determination as to whether the signal in the direct path exhibits a sufficiently lesser or greater number of errors than the signal as processed by the linear filter 12 is established by the reference number applied to the comparator 62. The field timing signal at the reset terminal of counter 60 enables counter 60 to respond to the output of comparator 58 when the reference signals are being compared with the field timing signals. The confidence counter 64 stabilizes the determination of the error detection circuitry and develops the switching signal for MUX 70 and switch 76 for selecting the signal processing path that produces the "least" number of errors. It should be apparent from the above discussion that the term "least" used herein is relative and really denotes the number of errors to be tolerated before a switchover to the post coder path is made. Thus if the incoming video data is subjected to NTSC co-channel interference, the processing path that includes linear filter 12 (which removes the majority of the NTSC co-channel interference) will produce significantly fewer errors than the direct signal processing path and, depending upon the reference number selected, MUX 70 and switch 76 will be switched to select the path through linear filter 12 and slicer/decoder 78 for supplying the signal to video processor 72. On the other hand, if the incoming video data is not subjected to significant NTSC co-channel interference, MUX 70 and switch 76 select the path from input terminal 10 through level slicer 80 and modulo 4 filter 82 for supplying the signal to video processor 72.

It will be appreciated that the particular techniques disclosed for identifying the field timing signal and selecting the alternate paths are interchangeable. Thus, the technique for comparing symbol errors may readily be substituted for the technique for accumulating errors in a data segment. Additionally, other error determination schemes may be employed with equal facility.

What is claimed is:

1. An HDTV receiver having a first terminal for receiving a precoded signal and a second terminal;
   linear filter means coupled between said first and said second terminals for desirably reducing the effects of certain interference signals but undesirably decreasing signal-to-noise ratio;
   means for determining the presence of said certain interference signals from the signals at said first and said second terminals;
   signal processing means for processing the received signal; and
   means for selectively coupling the signal at said first terminal and the signal at said second terminal to said signal processing means as a function of the presence of said certain interference signals.

2. The receiver of claim 1 wherein said determining means include first means for combining the signal at said first terminal with a first reference to produce a first error;
   second means for combining said signal at said second terminal with a second reference to produce a second error;
   means for comparing said first error with said second error; and
   means for controlling said selectively coupling means based upon said first error and said second error.

3. The receiver of claim 2 wherein said precoded signal is in the form of a plurality of repetitive data segments with one of said data segments comprising a field timing signal, and further including:
   means for providing respective first and second field timing signal reference data segments corresponding to said field timing signal; and
   said first combining means combining said one data segment produced at said first terminal with said first reference data segment and said second combining means combining said one data segment produced at said second terminal with said second reference data segment.

4. The receiver of claim 3 wherein the field timing signal comprises an N level signal, the first reference data segment is provided as an N level signal, the output of said filter means in response to said field timing signal comprises an M level signal and the second reference data segment is provided as an M level signal, where M is greater than N.

5. The receiver of claim 4 wherein said means for selectively coupling includes multiplexing means coupled to said controlling means, said first terminal being coupled to one input of said multiplexing means and said second terminal being coupled to the outer input of said multiplexing means.

6. The receiver of claim 5 wherein said controlling means comprises confidence counter means coupled between the output of said comparison means and said multiplexing means.

7. The receiver of claim 6, wherein said multiplexing means couples said signal at said first terminal to said signal processing means through a complementary modulo 4 post-ode filter or couples said signal at said second terminal to said processing means through a level converter.

8. An HDTV receiver having a first terminal for receiving a precoded signal in the form of a plurality of repetitive data segments with one of said data segments comprising a non-precoded field timing signal, and a second terminal;
   linear filter means coupled between said first and said second terminals for desirably reducing the effects of certain interference signals but undesirably decreasing signal-to-noise ratio;
   first means for combining the signal at said first terminal with a first reference to produce a first error;
   second means for combining said signal at said second terminal with a second reference to produce a second error;
   means for comparing said first error with said second error;
   signal processing means for processing the received signal;
   means for selectively coupling the one of the signals at said first terminal and at said second terminal to said signal processing means; and
   means for controlling said selective coupling means based upon said first error and said second error.

9. The receiver of claim 8 wherein said controlling means comprises confidence counter means coupled between the output of said comparing means and said selectively coupling means.

10. The receiver of claim 8 wherein the field timing signal comprises an N level signal, the first reference is provided as an N level signal, the output of said filter means in response to said field timing signal comprises an M level signal and the second reference is provided as an M level signal, where M is greater than N.

11. The receiver of claim 10 wherein said selectively coupling means includes multiplexing means and wherein said multiplexing means couples said signal at said first terminal to said signal processing means through a complementary modulo 4 postcode filter or couples said M level signal at said second terminal to said processing means through a level converter.

12. An HDTV receiver for receiving a television signal including a precoded N level signal representing an N level video data signal comprising:
   a linear filter responsive to said received N level precoded signal for generating an M level output signal, where M is greater than N, said linear filter being configured for reducing co-channel interference characterizing said received signal;
   means for determining, during a predetermined time interval, which of said received N level precoded signal and said M level output signal is characterized by a smaller number of errors; and
   means responsive to said determining means for either modulo N filtering said received N level precoded signal for deriving said N level video data signal or for converting said M level output signal to an N level signal representing said N level video data signal.

13. The receiver of claim 12 wherein said received television signal includes a non-precoded field timing signal and wherein said determining means includes:
   first means for combining the signal at said first terminal with a first reference representing said field timing signal to produce a first error;
   second means for combining the signal at said second terminal with a second reference representing said field timing signal to produce a second error; and
   means for comparing said first error with said second error.

14. The receiver of claim 13 wherein said television signal is in the form of a plurality of repetitive data segments with one of said data segments comprising said field timing signal, and further including;
   means for providing respective first and second field timing signal reference data segments respectively corresponding to said first reference and said second reference; and
   said first combining means combining said one data segment produced at said first terminal with said first field timing signal reference and said second combining means combining said one data segment provided at said second terminal with said second field timing signal reference.

15. The receiver of claim 14 wherein said means responsive to said determining means includes a multiplexer, said first terminal being coupled to one input of said multiplexer and said second terminal being coupled to the outer input of said multiplexer.

16. The receiver of claim 13 wherein said precoded N level signal comprises a 4 level precoded signal representing a 4 level video data signal and a 2 level precoded signal representing a 2 level precoded video data signal, the levels of said 2 level precoded signal falling between the two uppermost and two lowermost levels of the levels of said 4 level precoded signal, and wherein said field timing signal comprises the two levels of said 2 level precoded signal, said first reference comprising a 2 level reference signal corresponding to said field timing signal and said second reference comprising a 3 level reference signal corresponding to the output of said linear filter produced in response to said field timing signal.

17. The receiver of claim 4 wherein N is two and M is three.

18. The receiver of claim 10 wherein N is two and M is three.

* * * * *